United States Patent [19]

Buschmann et al.

[11] Patent Number: 5,102,055
[45] Date of Patent: Apr. 7, 1992

[54] APPARATUS AND PROCESS FOR DISINTEGRATING A FIBER AGGLOMERATE

[75] Inventors: Rüdiger Buschmann, Hohenstein-Born; Karl Baum, Wiesbaden, both of Fed. Rep. of Germany

[73] Assignee: Didier-Werke AG, Wiesbaden, Fed. Rep. of Germany

[21] Appl. No.: 700,458

[22] Filed: May 15, 1991

[30] Foreign Application Priority Data

May 23, 1990 [DE] Fed. Rep. of Germany ....... 4016594

[51] Int. Cl.$^5$ .............................................. B07B 1/00
[52] U.S. Cl. .......................................... 241/5; 241/39; 241/79.1
[58] Field of Search ............... 241/5, 79, 79.1, 80, 241/39

[56] References Cited

U.S. PATENT DOCUMENTS

| | | |
|---|---|---|
| 1,157,092 | 10/1915 | Durell ................................. 241/39 |
| 1,211,736 | 1/1917 | Marshall ............................. 241/39 |
| 1,458,387 | 6/1923 | Bourne ................................ 241/5 |
| 1,747,913 | 2/1930 | Swanson . | |
| 2,560,807 | 7/1951 | Lobo .................................. 241/80 |
| 2,668,669 | 2/1954 | Skelly ................................ 241/80 |
| 3,326,474 | 6/1967 | Clary et al. ........................ 241/5 |

Primary Examiner—Frank T. Yost
Assistant Examiner—John M. Husar
Attorney, Agent, or Firm—Wenderoth, Lind & Ponack

[57] ABSTRACT

An apparatus for disintegrating a fiber agglomerate has a feed tank for receiving and holding a batch of a fiber agglomerate. A turbulence chamber is connected to the feed tank for receiving a subquantity of the batch of fiber agglomerate and disintegrating the fiber agglomerate into separate fibers with air turbulence. A screening chamber is connected to the turbulence chamber for receiving the subquantity of the batch of fiber agglomerate and screening out separate fibers from shot particles and remaining fibers. The residual fibers and shot particles are fed back to the feed tank for reprocessing to obtain the maximum output of cleaned, separated fibers.

18 Claims, 1 Drawing Sheet

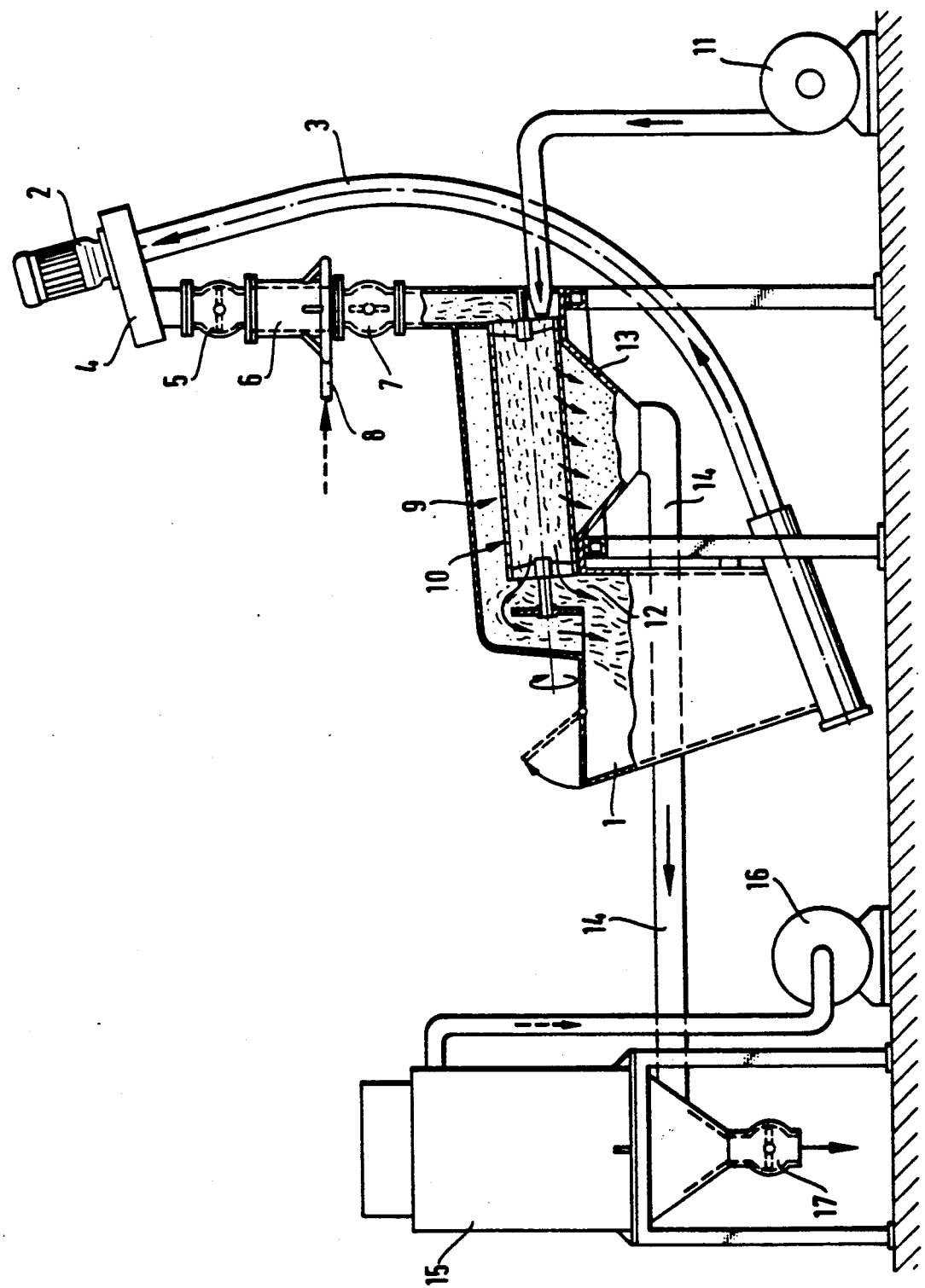

APPARATUS AND PROCESS FOR DISINTEGRATING A FIBER AGGLOMERATE

BACKGROUND OF THE INVENTION

The present invention relates to an apparatus and process for disintegrating a fiber agglomerate, in particular a fiber agglomerate made of ceramic fibers.

Raw ceramic fibers are often delivered by the supplier of the ceramic fibers in a severely matted condition, i.e. as a fiber agglomerate. In order to further process the fiber agglomerate, the fiber agglomerate must be disintegrated such that the fibers are separated. Furthermore, non-fibrous components and impurities must also be separated from the fiber agglomerate. Fibers which may need to be treated in this manner are, for example, mineral fibers, rock fibers, slag wool, glass fibers, and ceramic fibers. The fibers may have a length, for example, of a magnitude ranging from 0.1 to 0.5 mm.

Fibers of the above-mentioned type are used, for example, to reinforce diesel engine pistons made of light metals. It has been found that, if the fibers are not suitably disintegrated, the non-fibrous coarser particles, hereafter referred to as shot particles, will remain between the fibers. This may have an extremely negative impact on a component, in the above example a diesel engine piston, that is to be reinforced with the fibers.

Fibers of the above-mentioned type are also used for furnace linings. In gas-heated furnaces, in which high flue gas rates occur, shot particles can dissolve out of the fiber composite. The shot particles may then fall on the material being burned and pollute the material.

Fibers of the above-mentioned type can also be used in isolated frameworks. With strong vibrations, shot particles between the fibers can lead to the destruction of the framework formed by the fibers. This has an especially negative effect on catalytic packings or particle filter packings in the exhaust gas system of a motor vehicle.

Shot particles remaining in uncleaned fibers can also have a negative impact on components that are manufactured from the fibers. If the components need to be remachined at some point, the coarser, non-fibrous shot particles may break out of the component during the machining, e.g. by sawing, cutting, grinding etc. Such breakout can leave behind undesired surface defects in the remachined component.

It has been found that a direct dry screening of the fiber agglomerate is inefficient and ineffective. Far too few of the fibers in the fiber agglomerate exhibiting the desired fiber dimensions are separated from the fiber agglomerate. Furthermore, a high percentage of undesirable fiber fragments are produced.

Wet disintegration of fiber agglomerates and separation of fibers from coarser, non-fibrous shot particles has been conducted by means of varying rates of sedimentation in a liquid medium. However, it is very time consuming and thus is very expensive. Furthermore, this process is not sufficiently accurate, because large quantities of otherwise usable fibers are discarded along with the coarser particles.

OBJECTS OF THE INVENTION

The objects of the present invention are to provide an apparatus and process for disintegrating a fiber agglomerate in an efficient and effective manner so that the greatest possible portion of the desired fibers contained in a fiber agglomerate can be separated from the other undesirable particles in the fiber agglomerate without shortening the separated fibers through breakage.

SUMMARY OF THE INVENTION

The above objects of the present invention are achieved by a process according to the invention for disintegrating a fiber agglomerate. The process provides a feed tank for holding a batch of fiber agglomerate to be disintegrated, a turbulence chamber connected to the feed tank, and a screening chamber connected to the turbulence chamber. A batch of dry fiber agglomerate is loaded into the feed tank. Then, the fiber agglomerate from the feed tank is fed to the turbulence chamber. A stream of compressed air is applied to the turbulence chamber in order to cause turbulence therein and disintegrate the fiber agglomerate into separate fibers. The contents of the turbulence chamber is subsequently delivered to the screening chamber. Then, the screening chamber screens out the separate fibers from the shot particles contained in the fiber agglomerate.

Preferably, when the separated fibers are screened out only fibers below a certain size are screened out. The fibers and particles above the predetermined size not screened out by the screening chamber are redelivered to the feed tank for further processing.

In a further preferred feature of the process according to the present invention, the turbulence chamber has a valve disposed between itself and the screening chamber for controlling the delivery of the separated fiber agglomerate to the screening chamber. The step of delivering the separated fiber agglomerate to the screening chamber then preferably includes opening the valve and applying a reduced pressure to the screening chamber in order to suction the separated fiber agglomerate from the turbulence chamber.

In a further preferred feature of the process according to the present invention, the reduced pressure is applied to the screening chamber to assist the screening out of the separated fibers.

Individual batches of the fiber agglomerate are provided to the turbulence chamber from the feed tank, the individual batches being significantly smaller than the volume of the feed tank. These individual batches are then separately treated in the turbulence chamber. Thus, the desired separate fibers are separated from the coarser shot particles in batches. Each batch is loosened and separated in the turbulence chamber due to the turbulence of the applied compressed air. The fiber material in this state is then screened, and a high yield of the desired separate fibers can be obtained. Simultaneously, the fibers are cleaned. Furthermore, the separate fibers obtained can also be very easily and uniformly dispersed in water.

The above-described process according to the present invention has the further advantage in that it can be conducted with relatively few personnel. Thus the process is economical. Furthermore, very little dust is generated by the process according to the present invention, since the process is conducted under a reduced pressure in a system completely sealed to the outside environment.

Furthermore, the process according to the present invention has the advantage of preventing reagglomeration of the separated fibers. The reduced pressure applied to the screening chamber cause the fiber material to be suctioned from the turbulence chamber directly into the screening chamber and then the separated fibers suctioned off from the screening chamber. No opportunity is provided for the fibers to reagglomerate during this process The fiber material having a coarser fiber content is redelivered to the feed tank along with the shot particles, as noted above. Thus these coarser fibers are reconveyed to the turbulence chamber, improving the eventual yield of the process. Note that it is important to obtain as high a yield as possible in order to waste as few of the relatively expensive fibers as is possible.

The apparatus for disintegrating a fiber agglomerate according to the present invention includes a feed tank for receiving and holding a batch of a fiber agglomerate. A turbulence device is connected to the feed tank for receiving a subquantity of the batch of fiber agglomerate and disintegrating the subquantity into separate fibers with air turbulence, the turbulence device comprising a chamber with compressed air fed into the chamber. In addition, a screening device is connected to the turbulence device for receiving the subquantity of the batch of fiber agglomerate from the turbulence device and screening out the separated fibers from shot particles and remaining fibers.

Preferably, the turbulence device has a first valve between the chamber and the feed tank for alternately admitting a subquantity of the batch of fiber agglomerate to the chamber from the feed tank and shutting off the chamber from the feed tank and a second valve between the chamber and the screening device for alternately admitting a subquantity of the batch of fiber agglomerate from the chamber and shutting off the chamber from the screening device. The chamber preferably has a plurality of air inlets therein and a compressed air supply arrangement connected to the air inlets. In a further preferred feature, a conveyor is provided between the feed tank and the first valve for feeding a subquantity of the batch of fiber agglomerate to the chamber.

The screening device preferably has a screen which screens out the separate fibers from the shot particles and delivers the remaining fibers and shot particles to the feed tank. The screen has a suction pump which is operatively connected thereto for sucking the separate fibers through the screen. The screen further has a blower pump operatively connected to it for assisting the delivery of the remaining fibers and the shot particles back to the feed tank.

Preferably, the screen of the screening device is cylindrical, receives the subquantity of fiber agglomerate from the turbulence means at one end thereof, and delivers the remaining fibers and shot particles to the feed tank through the other end thereof. The screen is preferably rotatably mounted for rotation during operation. Furthermore, the cylindrical screen is angled downwardly along its axis toward the feed tank. In addition, the screen should be of a predetermined mesh size for screening the shot particles as well as fibers above a predetermined size.

The feed tank of the present invention preferably has an inlet for supplying the fiber agglomerate into the feed tank. The screening means is connected to the feed tank to deliver the shot particles and remaining particles not screened out by the screening device to the feed tank. The feed tank also has an outlet, with the conveyor being connected to the outlet for delivery of the fiber agglomerate to the turbulence device.

Preferably, the suction pump is connected to a separator for accumulating the separated fibers therein. The separator is connected to the screening device by a discharge line.

BRIEF DESCRIPTION OF THE DRAWING

Further features and advantages of the present invention will be apparent to those of skill in the art from the following description of the present invention in conjunction with the accompanying drawing figure. The figure is a schematic representation partly in section of an apparatus for disintegrating a fiber agglomerate according to the present invention.

DETAILED DESCRIPTION OF THE PREFERRED EMBODIMENTS

The apparatus according to the present invention has a feed tank 1 for receiving a batch of fiber agglomerate to be separated therein. The feed tank 1 has an inlet (unlabeled in the drawing) for disposing the fiber agglomerate in the feed tank. A conveyor 3, preferably a screw conveyor, is connected to the bottom of the feed tank 1 and is driven by a motor 2. The conveyor feeds the fiber agglomerate upwards out of the feed tank 1. A delivery channel 4 leads the fiber agglomerate from the conveyor 3. A first valve 5 is connected to the delivery channel 4 for controlling the delivery of the fiber agglomerate to a turbulence chamber 6. The turbulence chamber 6 has a second valve 7 at the outlet end thereof for controlling exit of fiber materials from the turbulence chamber 6.

Note that both the valves 5 and 7 are depicted as rotary valves in the figure, but can of course take many different forms. Connected to the turbulence chamber 6 is a compressed air arrangement 8 for providing blasts of compressed air into the turbulence chamber 6. A plurality of nozzles extend from the compressed air attachment 8 to inlets on the turbulence chamber 6.

The valve 7 opens downwardly into a screening chamber 9. In this screening chamber 9 is provided a screen 10 for screening the fibers from the shot particles and remaining, larger fibers exiting from the turbulence chamber 6. A blower fan 11 is connected to the screening chamber 9 for delivering air therethrough for assisting the flow of the shot particles as well as the remaining fibers back into the feed tank 1 from the screening chamber 9.

The screen 10 is preferably cylindrical and rotatably mounted so as to rotate during operation of the apparatus. A suitable electric motor (not shown) is provided for rotating the screen 10. A connecting passage 12 connects the screen 10 with the feed tank 1 as illustrated in the figure.

The entire system is under a reduced pressure to assist the flow of material from the turbulence chamber 6 to the screening chamber 9, the flow of separated fibers through the screen 10 and the flow of remaining fibers and shot particles back to the feed tank 1.

Below the screen 10 is a funnel 13 for collecting the separated fibers from the screen 10. The funnel 13 connects to a discharge line 14, which further connects to a separator 15. A suction pump 16 is connected to the separator 15, and thus a reduced pressure is applied to the separator 15, to the discharge line 14 and the funnel 13 to the screening chamber 9 as illustrated by the directional arrows in the figure. Also note that a discharge valve 17 is provided at the bottom of the separator 15.

The reduced pressure in the apparatus due to the suction pump 16, taking into account the blower fan 11, is, for example, 150–250 mm per water column pressure, and preferably 200 mm per water column. The suction pump 16 and the blower fan 11 are coordinated as a function of the process parameters, such as the size of the system, the quality of the fibers, the geometry of the system and the mesh size of the screen 10. A typical set of values is 12.5 m$^3$/min. for the blower fan 11 and 18 m$^3$/min. for the suction pump 16. However, all of these values are merely exemplary, and may vary substantially with changed parameters in the process or apparatus.

The rotation and inclination of the screen 10 are provided to assist the discharge of shot particles, together with the air from the blower fan 11. A typical speed range for the rotation of the screen 10 is 50 to 60 rpm. The angle of inclination typically ranges from 3° to 6°, and preferably is set at 4°. In consonance with the preferred embodiment described so far, the screen 10 has a mesh size of 0.025 mm, suitable for separating fibers by screening with a diameter of 3 μ. A screen with mesh size of 0.025 mm reliably separates fibers which have a diameter of 3 μ from shot particles having a diameter greater than 50 μ. Varying requirements of the size ratios of the shot particles to be separated and the separated fibers to be screened out will vary the screen mesh size.

The above-described apparatus operates in accordance with the following process.

The feed tank 1 is first filled with a fiber agglomerate. The fiber agglomerate is conveyed to the delivery channel 4 by the screw conveyor 3. The first valve 5 is opened, and the fiber agglomerate moves into the turbulence chamber 6. When the turbulence chamber 6 is filled with fiber agglomerate, the valve 5 is closed, with the valve 7 already being closed. The turbulence chamber 6 is then operated; i.e. compressed air is blasted into the turbulence chamber 6 through the inlets therein from the compressed air arrangement 8. The subquantity of fiber agglomerate contained in the turbulence chamber 6, whose volume is significantly less than that of the original amount of fiber agglomerate placed in the feed tank 1, is blasted by the compressed air so that fibers of the desired dimensions will be separated. The compressed air being delivered through the compressed air arrangement 8 can be controlled in force and rate in order to obtain an optimum degree of separation between the fibers and the shot particles, as a function of the types of fibers being separated and cleaned.

Thereafter, with the valve 5 closed, the valve 7 is opened and the fibers and shot particles are suctioned into the screening chamber 9, due to the reduced pressure generated in the apparatus by the suction pump 16. Fibers of the desired size are separated and suctioned through the rotating screen 10 into the funnel 13. The components remaining in the screen 10, i.e. the shot particles and remaining fibers, flow through the connecting passage 12 back into the feed tank 1 due to the rotation and slope of the screen 10 as well as the flow of air from the blower fan 11. The remaining fibers and shot particles are then repeatedly fed together with other fibers from the fiber agglomerate in the feed tank 1 to the turbulence chamber 6 and the screen 10.

From the funnel 13, the separated fibers flow through the discharge line 14 into the separator 15. From the separator 15 the separated fibers can be fed to further processing stations by the discharge valve 17.

EXAMPLE

The feed tank 1 was filled with 50 kg of ceramic raw fibers. The average fiber length was 0.12 mm with a shot particle content of 3 wt. %. Every 20 seconds the turbulence chamber 6 was loaded with approximately 200 grams of fibers, i.e. 600 grams per minute or 36 kg per hour. After a period of 8 hours, a total of 280 kg of fibers had been moved through the process cycle in the apparatus. In the separator 15, 20 kg of separated screened fibers had accumulated. The screen 10 had a mesh of 0.025 mm. The fibers had an average fiber length of 0.1 mm, with a residual shot particle content of less than 0.001 wt. %.

Note that the screening rate in the above example is 2.5 kg of separated fibers per hour. To separate the 50 kg of the fiber agglomerate completely, 18.8 hours would be required. The loss rate according to the example is 6%, and thus 47 kg of fibers would result after complete separation, and 3 kg of shot particles and residual fibers would remain. Thus, for each kg of raw fiber, 940 g of fibers were separated out by screening and 60 g of shot particles and residual fibers remained as loss.

Although the present invention has been described and illustrated with respect to preferred features thereof, it is to be understood that various modifications and changes to the specifically described and illustrated features of the apparatus and process without departing from the scope of the present invention.

We claim:

1. A process for disintegrating a fiber agglomerate, comprising the steps of:
   providing a feed tank for holding a batch of fiber agglomerate to be disintegrated, a turbulence chamber connected to said feed tank, and a screening chamber connected to said turbulence chamber;
   loading a batch of dry fiber agglomerate into said feed tank;
   feeding the fiber agglomerate from said feed tank to said turbulence chamber;
   applying a stream of compressed air to said turbulence chamber to cause turbulence therein and disintegrating the fiber agglomerate into separate fibers with the turbulent air;
   delivering all of the separated fiber agglomerate to said screening chamber; and
   screening out the separated fibers from shot particles contained in the fiber agglomerate in said screening chamber.

2. The process of claim 1, wherein:
   said step of screening further comprises screening out only the separate fibers that are below a predetermined size; and
   said process further comprises the step of redelivering larger fibers above said predetermined size not screened out by said screening chamber to said feed tank.

3. The process of claim 1, wherein:
   said turbulence chamber has a valve disposed between itself and said screening chamber for controlling the delivery of the separated fiber agglomerate to said screening chamber; and
   said step of delivering comprises opening said valve and applying a reduced pressure to said screening chamber to suction the separated fiber agglomerate from said turbulence chamber.

4. The process of claim 1, wherein said:
said step of screening comprises applying a reduced pressure to said screening chamber to assist the screening out of the separated fibers.

5. An apparatus for disintegrating a fiber agglomerate, comprising:
a feed tank for receiving and holding a batch of a fiber agglomerate;
a conveyor having one end connected to said feed tank for feeding fiber agglomerate therefrom;
a turbulence means for receiving a subquantity of the batch of fiber agglomerate from said feed tank and disintegrating the subquantity of the batch of fiber agglomerate into separate fibers with air turbulence, said turbulence means comprising a chamber connected to the other end of said conveyor having compressed air fed into said chamber, a first valve between said chamber and said other end of said conveyor and a second valve downstream of said chamber; and
a screening means connected to said turbulence means downstream of said second valve for receiving the subquantity of the batch of fiber agglomerate from said turbulence means and screening out the separate fibers from shot particles and remaining fibers.

6. The apparatus of claim 5, wherein:
said first valve between said chamber and said conveyor is a means for alternatively admitting a subquantity of the batch of fiber agglomerate to said chamber from said feed tank and shutting off said chamber from said conveyor and said second valve between said chamber and said screening means is a means for alternately admitting a subquantity of the batch of fiber agglomerate to said screening means from said chamber and shutting off said chamber from said screening means.

7. The apparatus of claim 6, wherein said chamber has a plurality of air inlets therein and a compressed air supply arrangement connected to said air inlets.

8. The apparatus of claim 5, wherein said screening means comprises a screen which screens out the separate fibers from the shot particles and delivers the remaining fibers and shot particles to said feed tank.

9. The apparatus of claim 8, wherein said screen has a suction pump operatively connected thereto for sucking the separate fibers therethrough.

10. The apparatus of claim 9, wherein said screen further has a blower pump operatively connected thereto for assisting the delivery of remaining fibers and shot particles to said feed tank.

11. The apparatus of claim 8, wherein said screen of said screening means is cylindrical, receives the subquantity of fiber agglomerate from said turbulence means at one end thereof, and delivers the remaining fibers and shot particle to said feed tank through the other end thereof.

12. The apparatus of claim 11, wherein said screen is rotatably mounted for rotation during operation.

13. The apparatus of claim 12, wherein said cylindrical screen is angled downwardly along its axis toward said feed tank.

14. The apparatus of claim 8 wherein said screen is of a predetermined mesh size for screening the shot particles as well as fibers above a predetermined size.

15. The apparatus of claim 5, wherein said feed tank has an inlet, said screening means is connected to said feed tank to deliver the shot particles and remaining fibers not screened out by said screening means to said feed tank, said feed tank has an outlet, and said conveyor is connected to said outlet for feeding the subquantity of fibers to said chamber.

16. The apparatus of claim 15, wherein said screening means has a suction pump operatively connected thereto for sucking the separate fibers therethrough.

17. The apparatus of claim 16, wherein said suction pump is connected to a separator for accumulating the separate fibers therein, said separator being connected to said screening means by a discharge line.

18. The apparatus of claim 15, wherein said screening means has a blower pump operatively connected thereto for assisting the delivery of the shot particles and remaining fibers not screened out by said screening means to said feed tank.

* * * * *